(12) United States Patent
Zhang

(10) Patent No.: US 8,696,459 B2
(45) Date of Patent: *Apr. 15, 2014

(54) MEASUREMENT AND SEGMENT OF PARTICIPANT'S MOTION IN GAME PLAY

(76) Inventor: Evan Y. W. Zhang, Beavercreek, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,414

(22) Filed: May 14, 2012

(65) Prior Publication Data

US 2012/0225718 A1 Sep. 6, 2012

Related U.S. Application Data

(63) Continuation of application No. 12/478,533, filed on Jun. 4, 2009, now Pat. No. 8,187,097.

(60) Provisional application No. 61/058,798, filed on Jun. 4, 2008, provisional application No. 61/058,790, filed on Jun. 4, 2008.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .......................................................... 463/36

(58) Field of Classification Search
USPC ............................................................ 463/37
See application file for complete search history.

(56) References Cited

U.S. PATENT DOCUMENTS

| 6,100,517 | A | * | 8/2000 | Yahav et al. | 250/208.1 |
| 2005/0157204 | A1 | * | 7/2005 | Marks | 348/370 |
| 2008/0252596 | A1 | * | 10/2008 | Bell et al. | 345/156 |
| 2008/0261693 | A1 | * | 10/2008 | Zalewski | 463/31 |

* cited by examiner

*Primary Examiner* — Omkar Deodhar
*Assistant Examiner* — Reginald Renwick
(74) *Attorney, Agent, or Firm* — Thomas E. Lees, LLC

(57) ABSTRACT

Systems and methods are provided for the measurement and input of position information and/or information regarding the position and/or movement and/or speed of a target of interest, e.g., without requiring a hand-held controller. According to further aspects of the present invention, systems and methods are provided for removing background images, such as furniture and other items, shadows, etc., in the environment of an associated camera or cameras. The elimination of background images behind the subject reduces processing requirements to track the movements of a participant, and may avoid the potential of the image processing logic to confuse the background with the image of the subject. Parabolic LEDs are also provided, which provide safe illumination and gating. As an alternative to gating, a grating or grid light source may be utilized. Still further, a participant's image may be integrated into video applications including games.

15 Claims, 14 Drawing Sheets 12   30

12   30

The Principles of The 3-D Gated Camera

MEASUREMENT AND SEGMENT OF PARTICIPANT'S MOTION IN GAME PLAY

CROSS REFERENCE TO RELATED APPLICATIONS

This application is a continuation of U.S. patent application Ser. No. 12/478,533, filed Jun. 4, 2009, entitled "MEASUREMENT AND SEGMENT OF PARTICIPANT'S MOTION IN GAME PLAY", which claims the benefit of U.S. Provisional Patent Application Ser. No. 61/058,798 filed Jun. 4, 2008 entitled "MEASUREMENT AND SEGMENT OF PARTICIPANT'S MOTION IN GAME PLAY" and U.S. Provisional Patent Application Ser. No. 61/058,790 filed Jun. 4, 2008 entitled "A CONSTANT AND SHADOWLESS LIGHT SOURCE, the disclosures of which are all hereby incorporated by reference in their entirety.

BACKGROUND

The present invention relates to the measurement and segmentation of the motion of a participant interacting with or responding to electronic events such as may be generated by game play of a video game and/or other interactive computer applications.

Currently, video game systems are known, which provide a wireless controller that can be used as a hand-held pointing device. For example, a known video game system uses two Light Emitting Diode (LED) light sources above a display such as a television and a stick control that includes a camera with an integrated accelerometer to control the game. In this regard, the game system processor is capable of detecting movement of the pointing device to facilitate interaction with corresponding games that are presented on a video display. However, even with the wireless pointing device, such game systems have many shortcomings.

For example, interaction with a game requires the user to wield the wireless hand-held pointing device. This requirement to hold onto a hand-held pointing device limits the freedom of the game participant to engage in game or non-game interaction that requires the use of fingers or hands. Further, systems respond to the player's body movement, and thus cannot, for example, sense the rotation of the player's hand. Moreover, the requirement of a wireless hand-held device precludes the use of feet, legs, head, etc., for interaction with the game system. Still further, required motions for game interaction, such as waving the wireless controller to play a game, may not be convenient or practical for all participants, especially those participants that have difficulty executing the required movements. Still further, the requirements of a given game or activity may not dictate such waiving motions typically required for detection of conventional hand-held pointing devices. Correspondingly, many games may not be played, e.g., due at least in part to the limitations of detectable movement of the wireless controller. As such, there are many activities that cannot be implemented or implemented well by the above-described type of game system.

BRIEF SUMMARY

According to various aspects of the present invention, a system for measuring movement of a target for use by a video game or virtual interactive computer application is provided. The system comprises a camera having a light receiving lens and an image sensor for converting the light received through the light receiving lens to two-dimensional image data and at least one illumination source associated with the camera, which emits light directed towards a target of interest within a limited three dimensional space. The system further comprises processing electronics having a processor coupled to the image sensor that generates a digital representation of the target of interest.

In this regard, the processor is configured to measure the time of flight of the light emitted by the illumination source to measure the distance to the target of interest, to read the two-dimensional image data from the image sensor of the camera and to combine the time of flight measurement information with the two-dimensional image data obtained by the image sensor of the camera to generate a three dimensional information with regard to the target of interest.

According to still further aspects of the present invention, a system for measuring movement of a target for use by a video game or virtual interactive computer application comprises a camera having a light receiving lens and an image sensor for converting the light received through the light receiving lens to two-dimensional image data. The system further comprises an illumination source associated with the camera, which emits light directed towards a target of interest within a limited three dimensional space and a grid mask having a grid pattern therein positioned with regard to the illumination source so as to project a light pattern into a defined space corresponding to the limited three dimensional space. Still further, the system comprises processing electronics having a processor coupled to the image sensor that generates a digital representation of the target of interest, the processor further configured to determine the position of the target of interest within the limited three dimensional space by identifying from the two dimensional image data from the image sensor, the grid cells of the light pattern that are blocked by the target of interest.

DETAILED DESCRIPTION

According to various aspects of the present invention, systems and methods are provided for the measurement and input of position information and/or information regarding the position and/or movement and/or speed of a target of interest, e.g., a video game participant's palms, hands, feet, legs, head, etc., without requiring a hand held controller or other position determining device located on the target of interest.

Thus, for example, a participant may interact with a video game and/or other interactive virtual computer application without requiring the participant to hold onto a controller. Rather, the participant may utilize their hands, feet and/or other body parts for interaction, e.g., to play a game or to respond to displayed electronic events. For example, a participant may use their hands to play virtual basketball or virtual boxing, their feet to play virtual soccer, football or dance, etc., without requiring the participant to grasp implements, e.g., controllers, game sticks, handlers, etc. Moreover, a participant may interact in virtual worlds or other non-game virtual realms without requiring a hand-held controller. Of course, a hand-held controller may be utilized, e.g., where such a device comprises part of the game or virtual computer application experience.

According to further aspects of the present invention, systems and methods are provided for removing background structures, such as furniture and other items in the environment of an associated camera, from interfering with a detected image of a target of interest. The elimination of background images including shadow behind the subject reduces processing requirements to track user movement and may avoid the potential of the image processing logic to confuse the background with the image of the target of interest.

In order for the system to measure position and/or movement, e.g., to know if the participant's hands are moving forward or back, left or right, and fast or slow during a video game, e.g., boxing, or other interactive virtual application, a system must be able to measure the distances, angles and speeds of movement initiated by each player. According to various aspects of the present invention, systems and methods are provided, which trace or otherwise track a participant, e.g., by identifying the position (distance), movement direction (angle) and/or speed of movement of the hands, feet, head, body, etc., of the participant in a limited 3-D space. This capability provides complete freedom to participate in games and/or to respond to other types of events in an interactive virtual environment without requiring the participant to wield hand controllers or other position determining tools.

Figure 1:
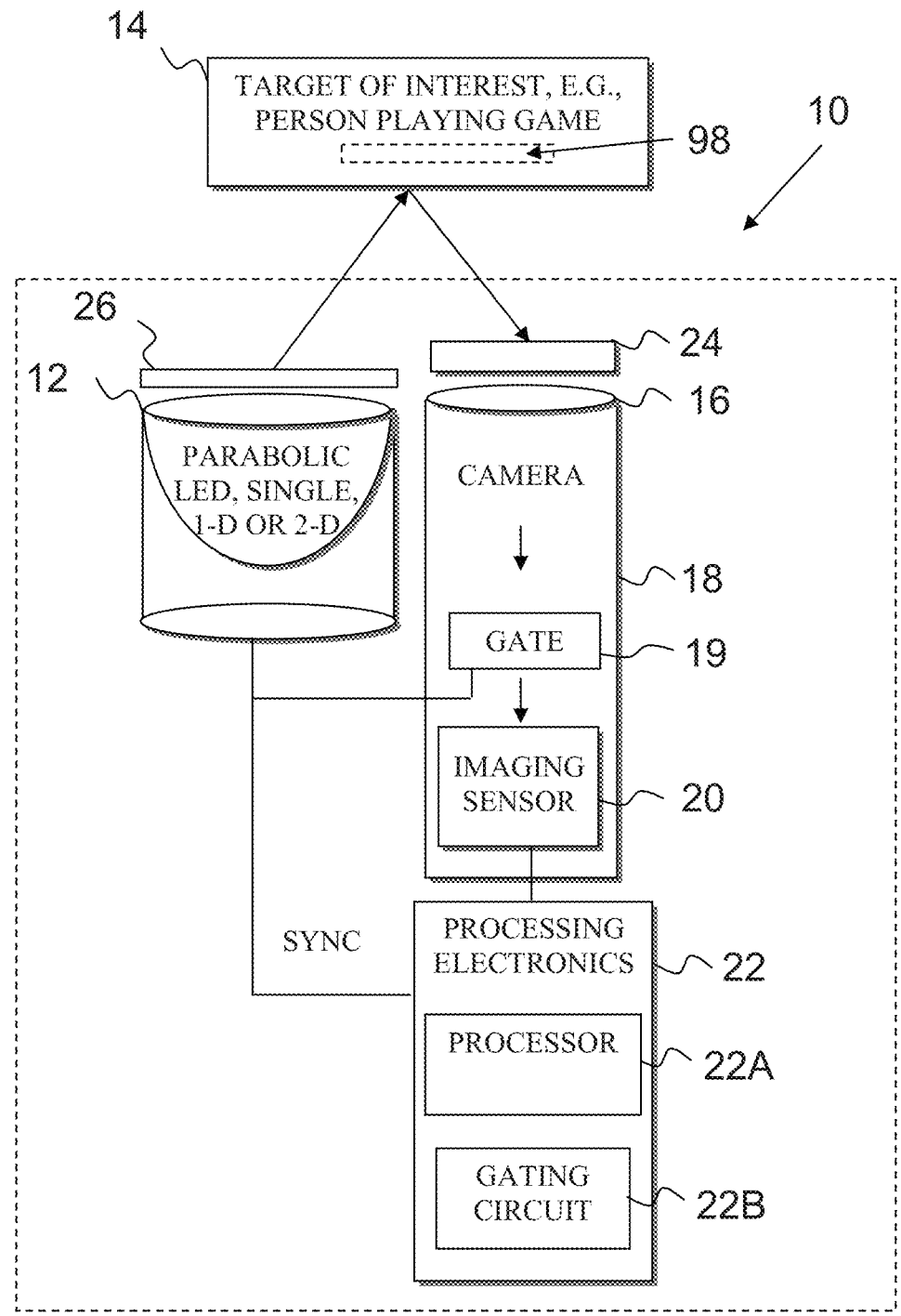
FIG. 1 is a schematic illustration of a system for measuring the location and/or movement of a target of interest, e.g., a player or a body part thereof, engaged with a video game or other virtual interactive application, according to various aspects of the present invention.

Referring now to the drawings, and in particular, to FIG. 1, according to various aspects of the present invention, a system 10 comprises at least one illumination source 12 to illuminate a target of interest 14, e.g., a participant interacting with a video game or other virtual interactive application. As an example, the illumination source(s) 12 may be implemented using one or more parabolic invisible light emitting diode(s) (PLED or parabolic LED) that emit a collimated thin beam or slightly divergent beam, which can be directed to illuminate a target of interest 14. Parabolic LEDs will be described more fully herein.

The light emitted from the illumination source 12 is received at a light receiving lens 16 of an associated camera 18, such as a color or black and white webcam. An optional gate 19 of the camera 18 may selectively enable the light entering the camera 18 to be converted into an image using a suitable image sensor 20. The image sensor 20 may be implemented using a focal plane array or other suitable imaging technology. The output of the image sensor 20 is then coupled to processing electronics 22, which process the image obtained by the image sensor 20 to derive a digital representation of a target of interest. For example, the processing electronics 22 may comprise hardware such as a processor 22A and any required supporting electronics and optional software for implementing the necessary processing, e.g., 3-D computations from the image information obtained by the image sensor 20. The processing electronics 22 may also control features of the system such as a gating circuit 22B or other processing that is utilized to facilitate measurement of the participant's movement in a limited 3-D space as will be described in greater detail herein.

For example, as will be described in greater detail herein, the processor 22A may be coupled to the image sensor 20 and may be configured to generate a digital representation of the target of interest, e.g., by determining the position, movement, speed, direction, etc. of the target of interest, such as a participant of a video game or other interactive virtual computer application. The processor 22A may be further configured to measure the time of flight of the light emitted by the illumination source(s) 12 to measure the distance to the target of interest and to combine the time of flight measurement information with the two-dimensional image data obtained by the image sensor of the camera to generate a three dimensional information with regard to the target of interest.

A filter 24 may also be provided optically in front of either the light receiving lens 16 or the image sensor 20 of the camera 18 to block light in spectral bands that are not of interest. In this regard, the filter 24 may be integrated with the camera 18 or the filter 24 may be a separate filtering arrangement positioned relative to the camera 18. For example, the filter 24 may reject light in spectral bands defined by the bands of anticipated fluctuating visible ambient light. Alternatively, the filter 24 may be transmissive to light only in the frequency range (or ranges) of the corresponding illumination source(s) 12. Although FIG. 1 illustrates only a single filter positioned optically forward of the light receiving lens 16, it is understood that other/alternate filters and/or filter locations may also be utilized to filter the signal before the light reaches the image sensor 20. The processing electronics 22 may also/alternatively implement software filtering of the image collected by the image sensor, should such processing be necessary for a given application.

By way of illustration, the illumination source(s) 12 may emit near infrared (NIR) light, ultraviolet (UV) light or other invisible or substantially invisible light. Keeping with the above-illustrative exemplary NIR light-emitting sources 12, the filter 24 may comprise a plastic/glass NIR filter or a piece of developed negative film that is positioned in the front of the light receiving lens 16 or the imaging sensor 20 of the camera 18. As another illustrative example, the camera 18 may include a built-in visible light (VIS) cutoff filter that is suitably positioned along an optical path to block VIS light. In this example, the image sensor 20 is correspondingly sensitive to NIR light. In this regard, light detected by the camera 18 will be insensitive to dynamically changing visible light because the light detectable by the image sensor 20 defines a spectral range that is outside the range of anticipated fluctuating visible ambient light.

According to various aspects of the present invention, an optional diffuser 26, may be utilized to scatter the light from an associated illumination source 12 into many directions to reduce a shadow cast by a corresponding object, as will be described in greater detail below.

According to further aspects of the present invention, and as will also be described in greater detail below, a plurality of cameras 18, e.g., two cameras 18, which can be implemented as discrete cameras or a single stereo camera/webcam, etc., may be coupled to the processing electronics 22. For example, a stereo camera may be utilized to measure the distance, angle and/or speed of the participant's hands, feet and body movements on the image sensor 20, e.g., a focal plane array of the stereo camera 22. Alternatively, image information from two cameras can be combined by the processing electronics 22 to render 3-D information.

Figure 2:
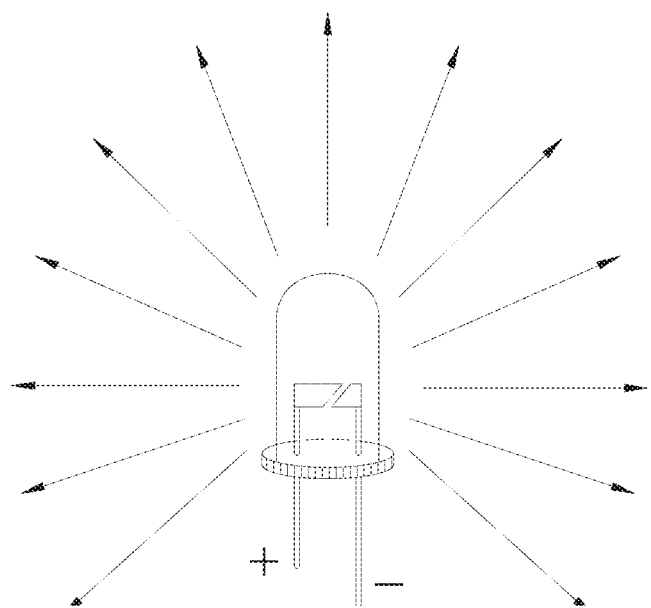
FIG. 2 is an illustration of a conventional LED.

Referring to FIG. 2, for a conventional LED 30, a significant portion of emitted light is wasted in its backward propagation. Moreover, the forward propagating angle of light emitted from a conventional LED is too large. Therefore, the intensity density of a conventional LED is too low and the distance is too short for the LED to be practical for illumination of a participant, e.g., a player of a video game who may be positioned several feet from the illumination source.

Figure 3:
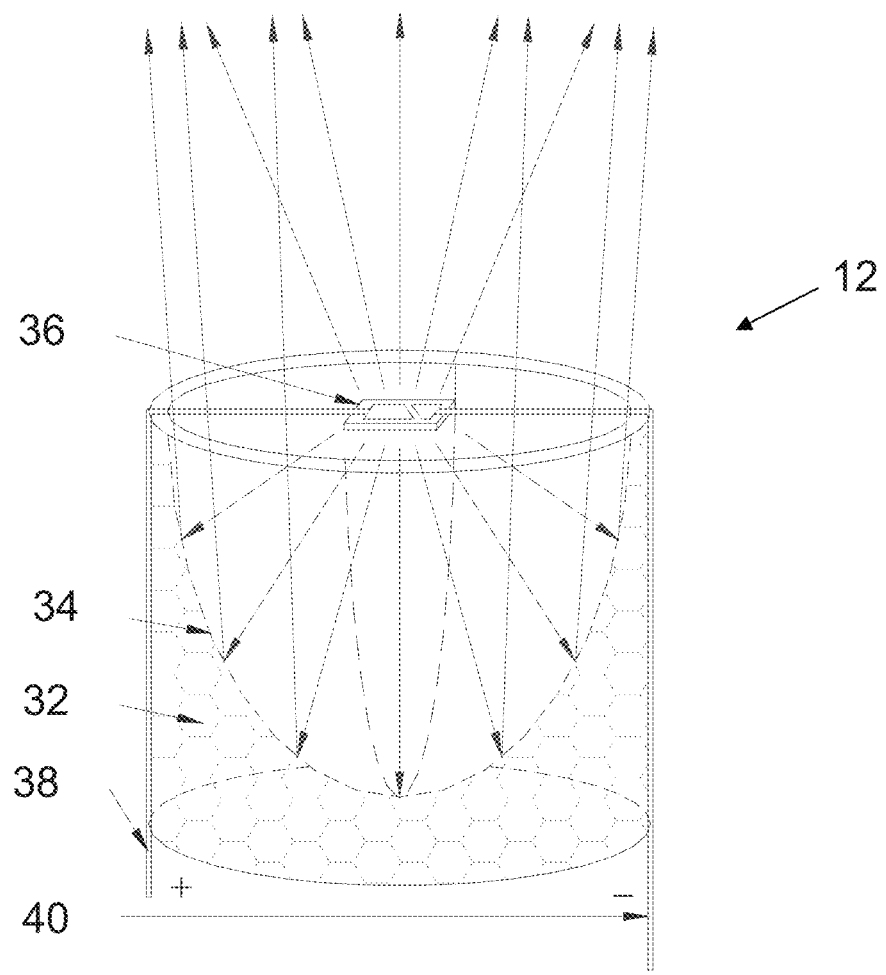
FIG. 3 is an illustration of select internal components of the parabolic LED of FIG. 3, according to various aspects of the present invention.

Parabolic LED Light Source:

As noted above, one or more illumination sources 12 may be implemented as a parabolic LED. Referring to FIG. 3, a parabolic LED 12 is illustrated according to various aspects of the present invention. The parabolic LED 12 comprises a convex parabolic model 32 and a concave parabolic reflector 34. For example, the convex parabolic model may be about 10-20 mm in dimension. The concave parabolic reflector 34 may comprise, for example, a stamped-on plate of thick heated plastic. A thin layer of aluminum may be coated over the plate to increase the reflectivity.

The parabolic LED 12 is configured such that an LED die 36 is positioned at the focal point of the parabolic reflector 34. Two legs 38, 40 provide a path for the die 36 to receive DC power (+ and −) from a suitable power supply and corresponding circuitry (not shown). For example, the legs may comprise two generally r-shaped legs that are glued or welded on the outer surface of the cylinder that houses the LED die 36 and corresponding parabolic structures. The legs 38, 40 are then attached, e.g., via welding, to the LED die 36. Moreover, a component such as a transparent epoxy may be injected into the LED to cover the LED die 36 and the corresponding concave parabolic space, e.g., to prevent oxidizing of the die 36. A component such as epoxy may further hold the die 36 in a secure manner.

According to various aspects of the present invention, the parabolic LED 12 is capable of collecting the backwards light from the die. Moreover, the parabolic LED 12 may be capable of generating an almost collimated beam. As such, a high intensity and long distance illumination light may be obtained. According to further aspects of the present invention, the beam angle may be adjusted by positioning the die 36 so as to align at a position other exactly on the focal point.

Figure 4:
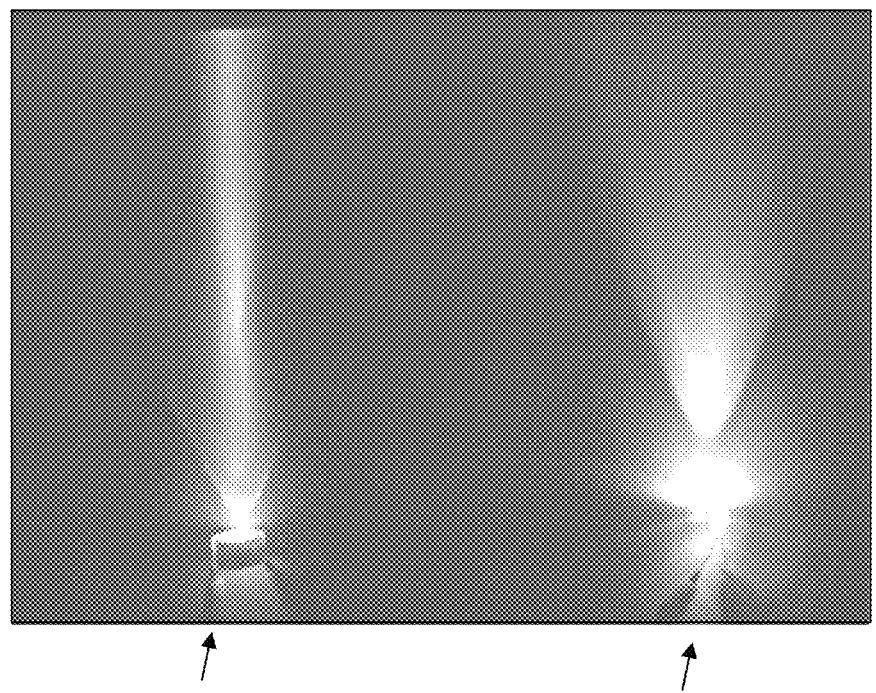
FIG. 4 is a photographic illustration comparing the beam of an exemplary parabolic LED manufactured according to various aspects of the present invention, to a conventional LED.
Figure 5:
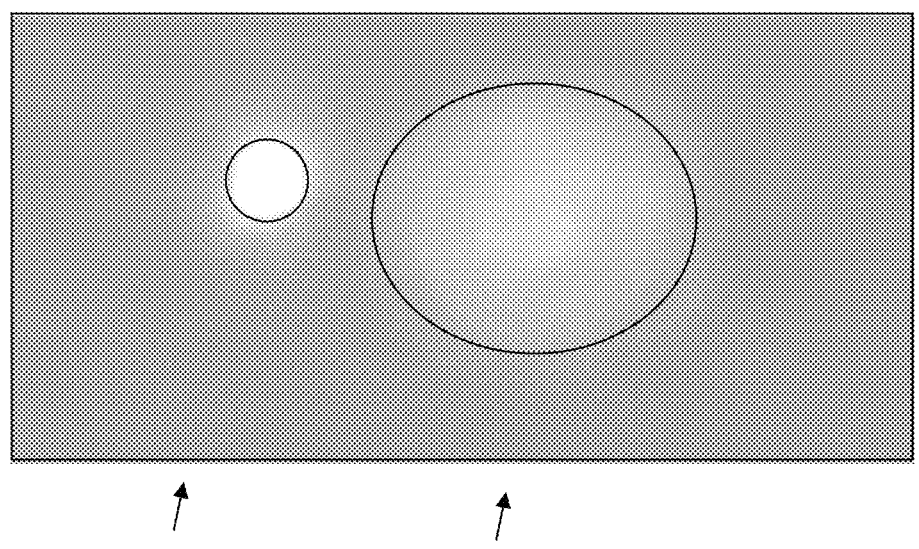
FIG. 5 is a photographic illustration comparing the beam spot of the parabolic LED according to various aspects of the present invention, to a conventional LED.

Referring to FIGS. 4 and 5, an exemplary implementation of a parabolic LED 12 according to various aspects of the present invention is compared to a convention LED 30. The parabolic LED 12 and conventional LED 30 are placed at the same line on a table. Additionally, the same voltage of 3V is applied to both the parabolic LED 12 and the conventional LED 30 to illuminate a wall that is located the same distance from both the parabolic LED 12 and the conventional LED 30. FIG. 4 illustrates that the output from the parabolic LED 12 is a powerful and almost collimated beam without significant backward light and the output from the conventional LED 30 is a low-intensity divergent beam with backward light. Similarly, FIG. 5 illustrates that the output from the parabolic LED 12 forms a small concise beam spot and the conventional LED forms an indistinct large spot. According to various aspects of the present invention, the parabolic LED 12 may be capable of approximately 20 times smaller spot diameter and 30 times longer distance than the conventional LED 30.

The parabolic LEDs 12 may further implement any of the features as described more fully in U.S. Provisional Patent Application Ser. No. 61/058,798, entitled "MEASUREMENT AND SEGMENT OF PARTICIPANT'S MOTION IN GAME PLAY" filed Jun. 4, 2008, U.S. Provisional Patent Application Ser. No. 61/058,790 filed Jun. 4, 2008 entitled "A CONSTANT AND SHADOWLESS LIGHT SOURCE", and corresponding U.S. patent application Ser. No. 12/478,515, entitled "A CONSTANT AND SHADOWLESS LIGHT SOURCE", the disclosures of which are incorporated by reference in their entirety.

Moreover, the parabolic LED 12 may output invisible light (although it can output ultra violet or visible light), or at least light in a spectral range that is insensitive to anticipated dynamic ambient visible light from a corresponding environment. Also, the parabolic LED 12 may be utilized in a shadowless camera configuration with the corresponding camera 18 as described more fully in U.S. Provisional Patent Application Ser. No. 61/058,790 filed Jun. 4, 2008 entitled "A CONSTANT AND SHADOWLESS LIGHT SOURCE" and corresponding, U.S. patent application Ser. No. 12/478,515, entitled "A CONSTANT AND SHADOWLESS LIGHT SOURCE."

In this regard, the parabolic LED 12 may implement an illumination source that is capable of emitting light into an environment where the emitted light is in at least a first predetermined frequency band that defines a spectral range outside the range of anticipated fluctuating ambient light. Referring back to FIG. 1, under this arrangement, the optional filter 24 is configured to substantially block light in an anticipated spectral range fluctuating ambient light and/or be transmissive only to light generally in the first predetermined frequency band from the PLED. Similarly, the optional diffuser 26 may be positioned optically in front of the parabolic LED(s) 12 to diffuse the light emitted thereby as described more fully in U.S. Provisional Patent Application Ser. No. 61/058,790 filed Jun. 4, 2008 entitled "A CONSTANT AND SHADOWLESS LIGHT SOURCE" and corresponding U.S. patent application Ser. No. 12/478,515, entitled "A CONSTANT AND SHADOWLESS LIGHT SOURCE."

Figure 6:
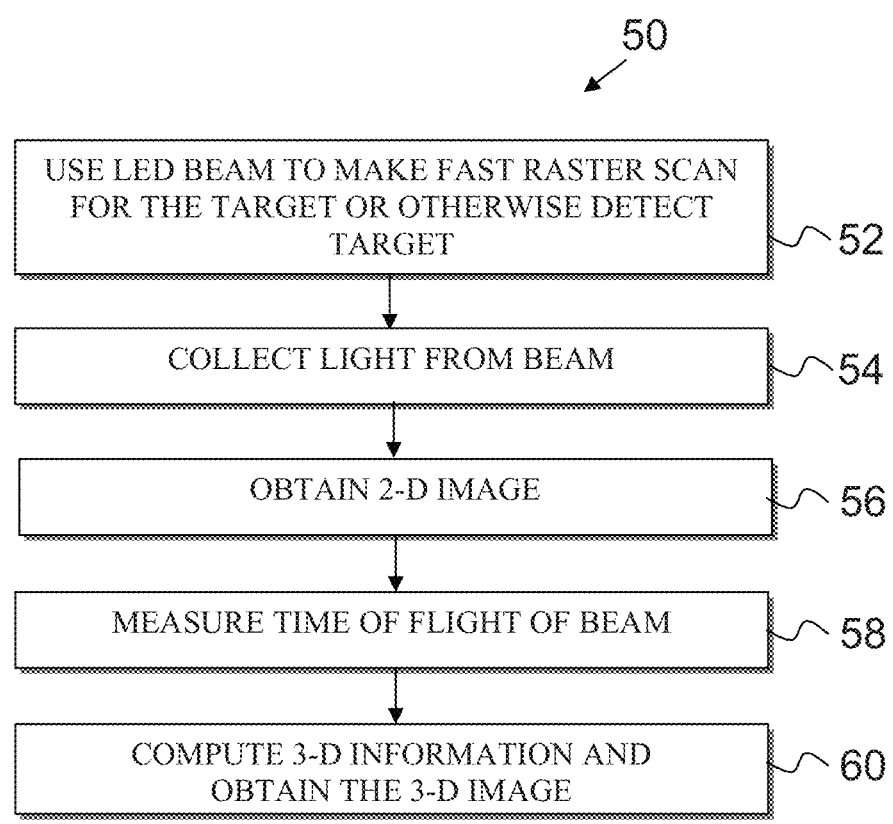
FIG. 6 is a flow chart illustrating a method of measuring a target of interest according to various aspects of the present invention.

Measurement of Participant's Motion Using Range-Gating Segmentation:

Referring to FIG. 6, a method 50 is provided to measure movement, e.g., of a player interacting with a video game according to various aspects of the present invention. A thin LED beam, e.g., using the parabolic LED 12 described more fully herein, may be utilized to make a 2-D fast raster scan for a player or participant at 52, or a 1-D parabolic LED array vertically placed may be utilized to make a 1-D fast raster scan for the player at 52. A 2-D parabolic LED array may also be utilized to illuminate the player at 52 without scan. The light from the beam is collected by a detector such as a camera at 54, and a 2-D image position, e.g., of a hand of the player, may be generated on an image sensor at 56. For example, light may be collected by the camera 18 and the collected light may be imaged using the image sensor 20, e.g., a 2-D Charge Coupled Device(CCD), intensified Charge Coupled Device (ICCD) or other suitable image sensor.

To obtain distance information, such as the distance to the hand of the player, and to further determine dynamic movement information, e.g., is the hand moving forward or backward, etc., the time of flight of a beam from at least one illumination source is measured at 58. From the time of flight data, 3-D information may be computed and a 3-D image may be obtained at 60.

Figure 7:
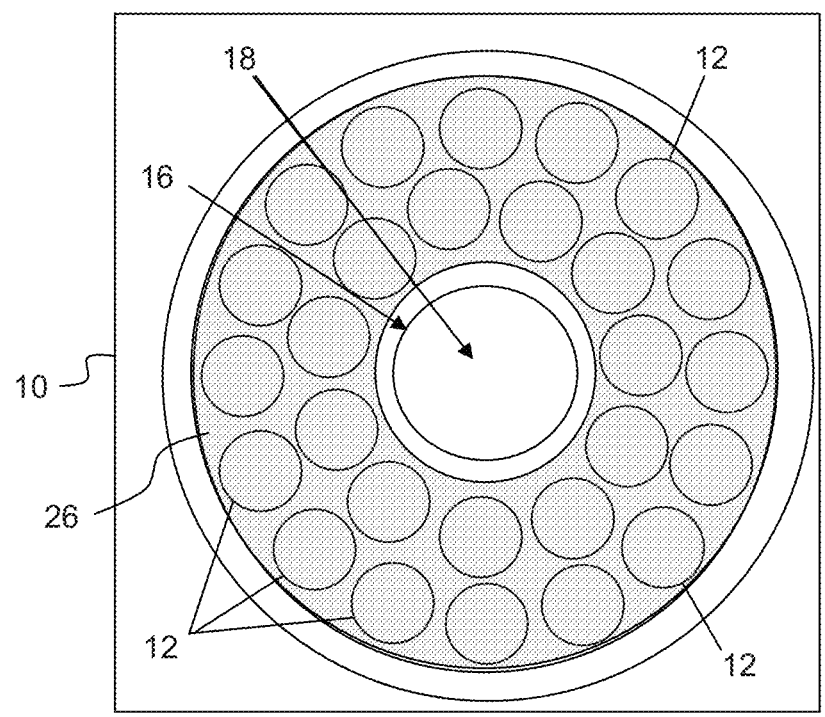
FIG. 7 is a schematic illustration of a plurality of illumination sources surrounding the light receiving lens of a corresponding camera according to various aspects of the present invention.

As an example, FIG. 7 illustrates an implementation of the system 10 that utilizes a plurality of illumination sources 12, e.g., parabolic LEDs arranged in a configuration that surrounds the camera lens 16 of the camera 18. Although illustrated as a generally annular ring of illumination sources that surround the light receiving lens 16 of the camera 18 other configurations and number of illumination sources 12 may alternatively be utilized. Moreover, according to various aspects of the present invention, the illumination source(s) 12 are arranged proximate to the camera lens 16 so that the light receiving lens 16 receives light from the at least one illumination source at a sufficiently small angle so as to at least substantially reduce detected shadows of the illuminated target of interest. In this regard, the light that originates from the illumination source(s) 12 is proximate to the camera lens 16 and can be approximated as light that is "almost" from the camera lens 16, itself.

Also as noted above, an optional diffuser may be utilized to scatter the light from an associated illumination source 12 into many directions to reduce a shadow cast by a corresponding object. Under this arrangement, the optional diffuser 26 may be implemented as a generally "donut-shaped" configuration that is positioned so as to diffuse light from the illumination sources 12. Moreover, the diffuser 26 may be positioned so that it is not in an optical path of the light entering the lens 16 of the camera 18. However, the diffuser 26 may not be used according to various aspects of the present invention.

Let $t$ represent the time required for the illumination source(s) 12, e.g., parabolic LEDs, to launch light and receive the light back at a detector, e.g., the image sensor 20 of the camera 18, where the received light is from the target, e.g., the hand of the player of the video game. Let $d$ represent the distance from the illumination source(s) 12 and corresponding camera to the target. Under this arrangement, the distance from the target to either the illumination sources 12 or camera 18 is approximately the same because the illumination sources 12 are surrounding the camera 18 as illustrated in FIG. 7. Alternatively, a single illumination source 12 may be utilized, which is positioned proximate to the circumference of the light receiving lens 16 of the camera 18. In this regard, the distance $d$ from the illumination sources 12 and/or camera 18 to the target is:

$$d = ct/2$$

where c is the speed of light.

Therefore the 3rd dimension information d of the participant's movement can be obtained. Since the image sensor 20, e.g., a focal plane array (FPA) can obtain a 2-D image of the participant, a 3-D profile of the player can be constructed over time.

In this regard, software, e.g., executed by the processing electronics 22, may be utilized to compute 3-D information at 60. For example, the software may calculate the time of the target (such as hand) moving from one location to the other location to obtain the speed of the participant's movement. Moreover, time of flight information may be utilized to compute angle, orientation and direction information necessary to make 3-D determinations required by the video game or other interactive application.

Figure 8:
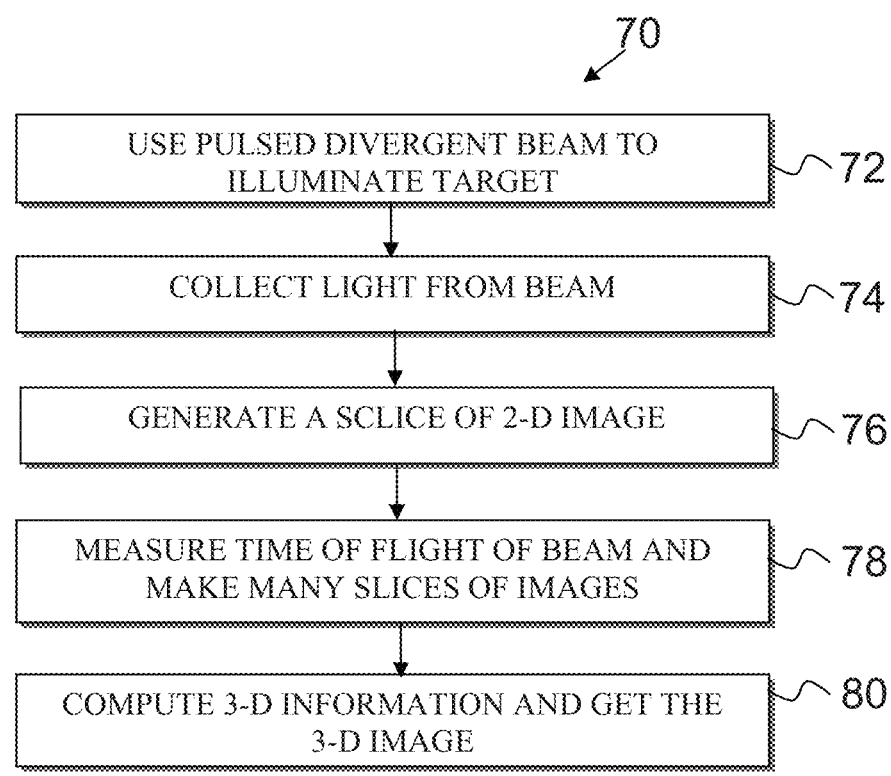
FIG. 8 is a flow chart illustrating another method of measuring a target of interest according to various aspects of the present invention.

Referring to FIG. 8, a method 70 provides an alternative to the method 50 described with reference to FIG. 6 to measure movement, e.g., of a player interacting with a video game, according to further aspects of the present invention. A pulsed divergent LED beam provided by a LED lamp is utilized at 72 to illuminate a target, e.g., a player interacting with a video game or other interactive application. A gated camera synchronizing with the pulsed LED is used to collect light from the beam at 74 and the collected information is utilized to generate a 3-D image at 76.

For example, with reference back to FIG. 1, the processing electronics 22 may control gating circuitry 22B, which is used to gate both the illumination source 12, e.g., implemented as a divergent beam LED, and the gating circuitry may be used to control a gate 19 on the camera 18.

Although a laser is capable of generating a fast pulse for gating, such a beam may be harmful, e.g., to the eyes of players or observers in the environment of the beam. Other light sources, e.g. incandescent bulbs, cannot generate pulses that are fast enough for gating. However, the LED techniques described more fully herein utilize semiconductor devices that are capable of generating a sufficiently fast pulse for gating that is not harmful to the eyes of players and observers in the environment.

In order to achieve a relatively high range of accuracy in generating the 3-D image, the LED must have narrow pulse width and a relatively high pulse repetition frequency. For example, a pulse width of approximately 200 picoseconds (ps) and a pulse repetition frequency (PRF) of approximately 32 kilohertz (kHz) may be utilized. Additionally, a relatively high-speed camera may be utilized. For example, a high-speed camera having gate times down to approximately 200 ps and delay steps down to approximately 100 ps may be utilized.

Figure 9:
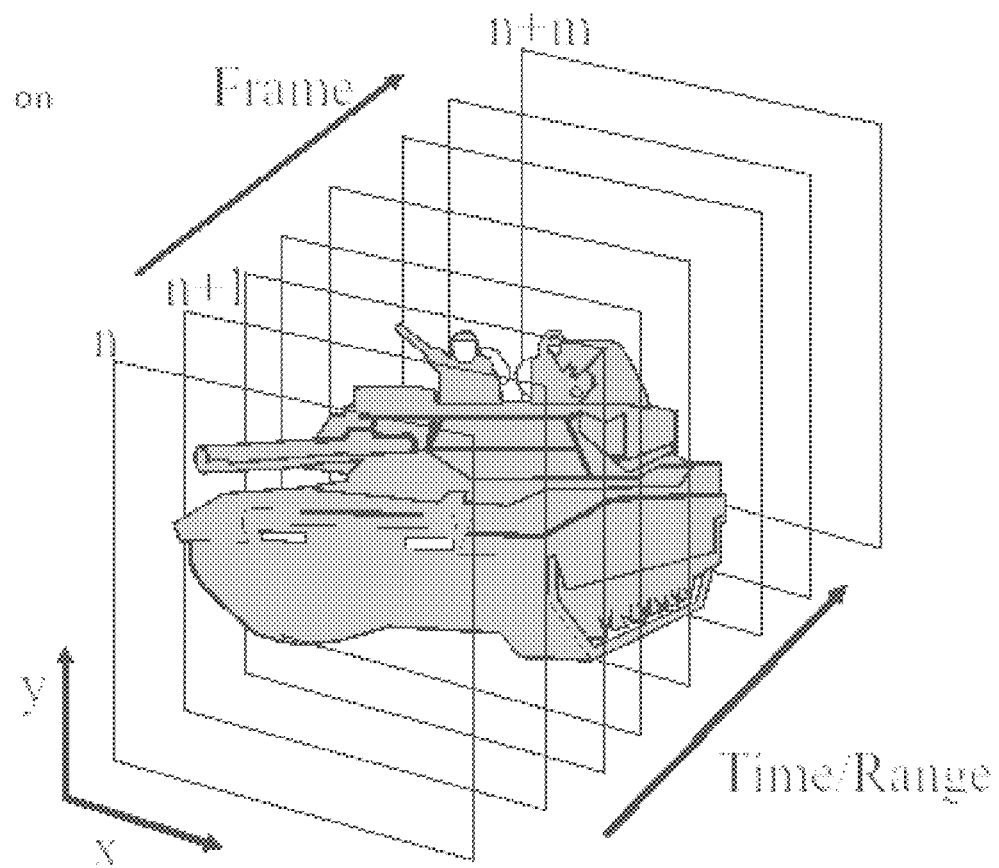
FIG. 9 is an illustration of an object modeled using a 3-D frame-based camera technique according to various aspects of the present invention.

As noted in greater detail herein, various aspects of the present invention may be suitable for use with a parabolic LED capable of producing a thin beam and certain aspects may be suitable for use with an LED capable of producing a divergent beam. In this regard, range-gating segmentation may be utilized to obtain the 3-D image. For example, the camera 18 may be opened, e.g., via gate 19, at $t_n$ for a duration of $\Delta t$:

$$t_n = t_0 + \Delta t$$

to get a slice (frame) of a 2-D target image on the image sensor 20 at a distance $d_n$ with thickness $\Delta d$. Here, $t_0$ is the time required for a beam of light from the illumination source(s) 12 to travel to the target just before touching the target and $\Delta t$ is the time required for the beam to cover the slice thickness $\Delta d$. Such time may comprise a time less than one nanosecond (ns) that corresponds to a spatial resolution of 15 cm. Thus, the camera gate 19 correspondingly should open for less than 1 ns. The pulse from the illumination source 12 must synchronize with the camera gating circuit. Similarly at $t_{n+1}=t_n+\Delta t$, the next slice image is obtained, and at $t_{n+m}=t_{n+m-1}+\Delta t$, the last slice or last frame image is obtained. By combining all slices/frames together, e.g., by the processor 22, a 3-D target image may be generated as illustrated in FIG. 9.

By measuring the distance and time of the target (such as hand) at different positions, the moving direction, angle and speed information may be obtained. Further, by setting a short gating time surrounding the target, the participant's moving area may be constrained at least in one dimension, e.g., to within 1.5 to 3.5 m. As such, any background structures from the environment, e.g., a sofa, curtains, furniture and other environmental background behind the target/participant can be removed. Moreover, the participant's shadow can also be removed.

Referring back to FIG. 1, in certain applications, a retro reflective material 98 may optionally be associated with the participant. For example, where the game or virtual interactive computer application requires a controller or other device, such device may include a retro reflective material 98. As a few illustrative examples, a retro reflection paint or similar materials can be applied to a controller, cloth, garment such as a glove or sleeve, playing tools, etc., that the participant will engage with, wear, etc. Still further, a retro reflection material 98 such as retro reflection tape may be stuck onto a controller or other suitable device.

Similarly, such retro reflection tape may be applied to cloth, a garment, playing tools, etc., that the participant will engage with, wear, etc. Still further, the retro reflective tape may be temporarily stuck to the participant, e.g., a body part, to reflect the light surrounding the camera back to the original path so the cameras can get good reference points to precisely measure the distance, angle and speed of the player/participant. For example, a retro reflective sticker attached to a hand, or attached to a glove or other suitable garment may provide more accurate positioning, especially where the retro reflective material reflects the light relatively efficiently back to the camera. Still further, retro reflective material 98 may be applied in multiple discrete locations, such as an elbow and hand of a participant. Such an arrangement provides two relatively high reflective surfaces for the processor 22A to identify for determining position, movement, speed, etc.

Figure 10:
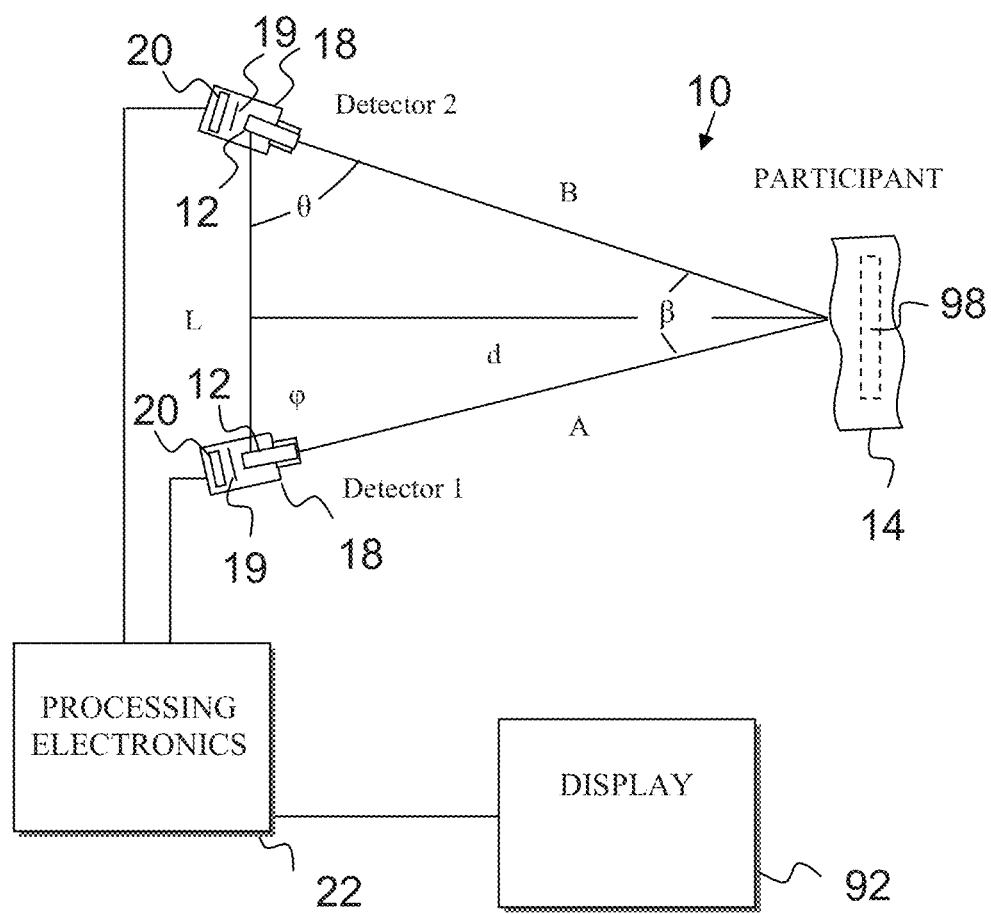
FIG. 10 illustrates a stereoscopic geometry of a system for measuring the location and/or movement of a target of interest using two cameras, according to various aspects of the present invention.

Measurement of Participant's Motion Using a Stereo Camera/Multiple Cameras:

According to further aspects of the present invention, two cameras may be utilized together to provide a stereo camera or stereoscopic imaging system. Referring to FIG. 10, two detectors, which are separated by a known distance d, are positioned so as to have known look angles $\partial$ and $\phi$.

When a point on the participant 14 is in the field of view (FOV) of both detectors, the angle between the two detectors is given by:

$$\beta = 180 - \theta - \phi$$

By using the law of sine:

$$A/\sin \partial = L/\sin \beta$$

Thus, the distance to the target 14 is determined by:

$$d = A \sin \phi = L \sin \phi \sin \partial / \sin(180 - \partial - \phi)$$

The accuracy of distance d (such as the participant's hand movement) depends on the accuracy of L, $\partial$, and $\phi$. The detectors, such as cameras 18 may image the participant on their associated image sensor 20, e.g., 2-D detector arrays. Thus, software, e.g., as executed by the processing electronics 22 including the processor 22A may be utilized to measure the angles, directions, and distances and thus triangulate the positions of the body parts (hands, feet, and head) of the player in the 3-D space, e.g., on a pixel-by-pixel basis. Moreover, because the time of the distance change can be measured, the speed of the movement can also be determined. Still further, by setting a threshold $d_0$, e.g., for a maximum distance, background images such as from fixed environmental features including furniture, lamps, etc., and from moving shadows detected at a distance further than the threshold $d_0$ can be removed from the video information.

FIG. 10 also illustrates that a retro reflective material 98 may optionally be associated with the participant as noted more fully herein. For example, retro reflection paint or similar materials can be applied to a controller, cloth, garment, playing tools, etc., that the participant will engage with, wear, etc. Still further, a retro reflection material 98 such as retro reflection tape may be stuck onto a controller or other suitable device. Similarly, such retro reflection tape may be applied to cloth, a garment, playing tools, etc., that the participant will engage with, wear, etc. Still further, the retro reflective tape may be temporarily stuck to the participant, e.g., a body part, to reflect the light surrounding the cameras back to the original path so the cameras can get good reference points to precisely measure the distance, angle and speed of the player/participant. In this application, gating may not be not necessary to use.

Figure 11:
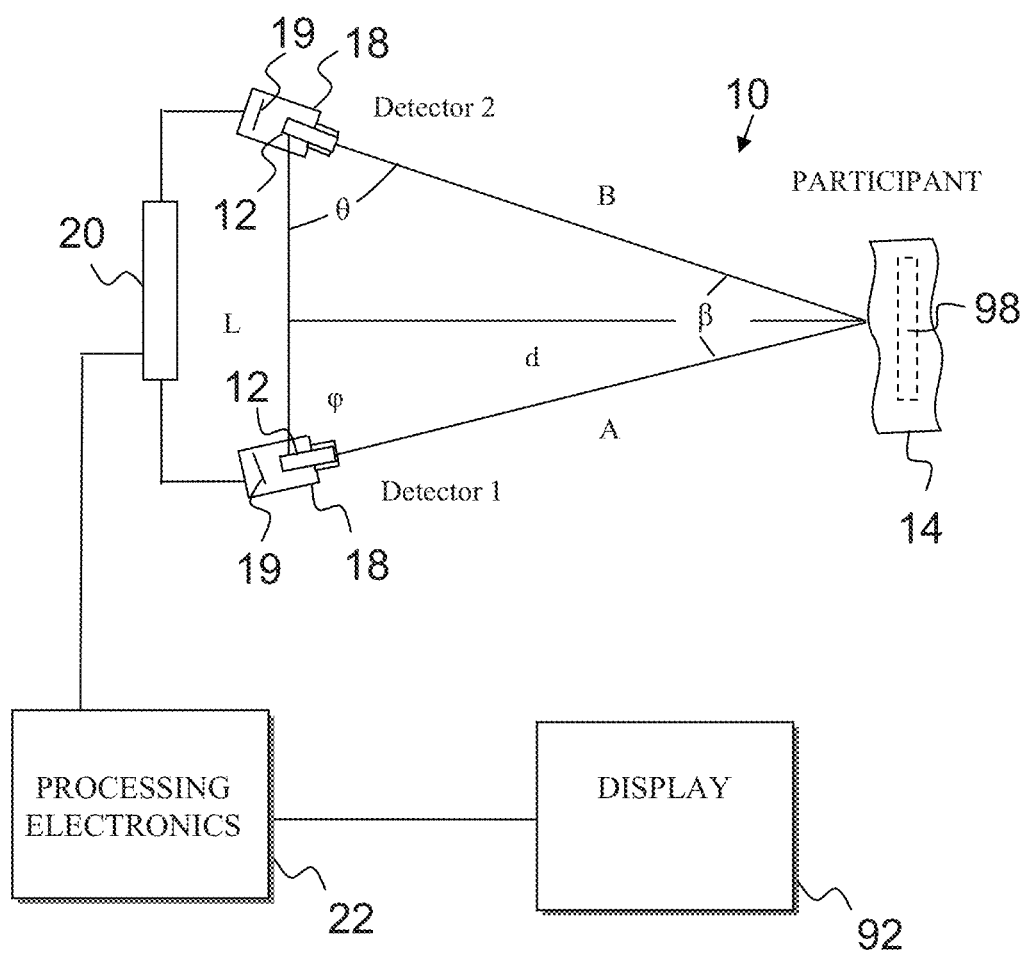
FIG. 11 illustrates a stereoscopic geometry of a system for measuring the location and/or movement of a target of interest, using a stereo camera according to various aspects of the present invention.

Referring to FIG. 11, a system is illustrated which is analogous to that of FIG. 10, except that a single stereo device is utilized in lieu of two independent devices. That is, the first and second cameras comprise a stereo camera such that the image sensor of the first and second cameras is implemented by a common image sensor to the stereo camera. For example, each camera shares a common image sensor 20, which is coupled to the processing electronics 22. In this implementation, the optional retro reflective material 98 may also be used. For example, the retro reflective material reflects the light surrounding the stereo camera back to the original path so the stereo camera can get good reference points to precisely measure the distance, angle and speed of the player/participant. In this application, gating may not be not necessary to use.

Various aspects of the present invention provide the ability to generate a digital representation of a target of interest, e.g., to measure positions of a target of interest such as the body parts of a video game player in real time. Accordingly, there is no requirement for a hand-held controller or other device to make position determinations, thus giving the participant more freedom, more convenience and a more exciting interactive experience.

As yet a further alternative, if there is no threshold $d_0$ for a maximum distance, e.g., where the player does not know how to determine or enter such information into the processing electronics 22, then the stationary background may be subtracted out. For example, one frame picture for the stationary background may be obtained first, without the subject in the field of view of the cameras 18, e.g., before the player enters the scene to start the game. During operation, the frame picture of the stationary background may be subtracted out from the video images thus removing the background information.

Moreover, as noted above, the system may be capable of reducing or eliminating moving shadows, e.g., using the techniques described more fully in U.S. Provisional Patent Application Ser. No. 61/058,790 filed Jun. 4, 2008 entitled "A CONSTANT AND SHADOWLESS LIGHT SOURCE" and corresponding U.S. patent application Ser. No. 12/478,515 entitled "A CONSTANT AND SHADOWLESS LIGHT SOURCE." In this regard, any features or aspects of the above-incorporated references may be combined with aspects set out more fully herein. In this regard, the image sensor 20 according to various aspects of the present invention set out herein, may be unaffected by ambient visible light, including dynamically changing ambient visible light from a television (TV) monitor, computer monitor or fluctuating light cast upon a ceiling or wall, etc.

Moreover, unlike conventional games, according to various aspects of the present invention, the participant's image can be put on a screen 92, e.g., by opening a window in an associated application. Other participant's image(s) may also be seen, e.g., by communicating image data across a network such as the Internet. Therefore two or more participants can see each other on their screen.

3-D Video Segmentation Using Gated Parabolic LEDs:

According to various aspects of the present invention, systems and methods are provided, which trace or otherwise track a body or object of interest in a 3-D space. For example, the system may identify the position (distance), movement direction (angle), orientation and/or speed of movement of the hands, feet, head, etc., of a participant of a video game or other electronic software application. This capability provides complete freedom to participate in games and/or to respond to other types of events in an interactive virtual environment without requiring the participant to wield hand controllers or other position determining tools unless such implements are required by the game itself.

As noted above, a plurality of cameras 18, e.g., two cameras 18 such as illustrated in FIG. 10, which can be implemented as discrete cameras, or a single stereo camera/webcam, as illustrated in FIG. 11, may be coupled to the processing electronics 22 in order to generate 3-D information, e.g., by triangulating angle measurements obtained from a stereo camera and corresponding illumination sources. For example, a stereo camera may be utilized to measure the distance, angle and/or speed of the participant's hands, feet and/or body movements on the image sensor 20, e.g., a focal plane array of the stereo camera 22 in a manner analogous to that set out with reference to the two-camera system of FIG. 10.

In this regard, the illumination source(s) 12 associated with a first camera 18 may create a shadow for a second camera 18, such as where the target cannot block the shadow created by the other illumination source(s). This can be seen because the first and second cameras 18 have a different illumination angle relative to the target 14. However, since the two cameras 18 are utilized in a system, a trigger may be utilized for each camera 18. In this regard, a first camera 18 and its associated illumination source(s) 12 are turned on and a second camera 18 and its illumination source(s) 12 are turned off. The trigger then toggles the state of each camera 18 such that the first camera 18 and its illumination source(s) 12 are turned off and the second camera 18 and its illumination source(s) are turned on, etc. The cycle speed may be set to obtain the desired quality of image. As an illustrative example, a cycle speed of approximately 60 Hertz (Hz) may be utilized by the trigger to toggle the action of each of the first and second cameras and their associated illumination source.

By way of further illustration, the processor 22A may be used to control, e.g., modulate the parabolic LED(s) 12 and other appropriate components of the system in a manner that enables the left and right channels of a stereo camera 18 or first and second discrete cameras 18 to work independently in a manner that facilitates interleaving of image data by the processor 22. As such, the parabolic LED illumination from a first one of the cameras 18 does not interfere with the image data received by a second one of the cameras, and vice versa.

For example, where two discrete cameras 18 are utilized, the corresponding parabolic LED(s) associated with a first camera 18 may be turned on and the parabolic LED(s) associated with the second camera 18 may be turned off. During this interval, the processor 22A gathers two-dimensional image data from the first camera 18, e.g., to collect one or more images and the second camera is not read. After a predetermined period, e.g., at least as long as the short pulse duration of the parabolic LED(s) of the first camera 18, the parabolic LED(s) associated with the first camera 18 are modulated off and the parabolic LED(s) 12 associated with the second camera 18 are modulated on.

During this new interval, the processor 22A gathers two-dimensional image data from the second camera 18, e.g., to collect one or more images and the first camera is not read. Thus, the parabolic LED(s) of the first and second cameras 18 are modulated on and off in an alternating manner that interleaves the active (modulated ON state) of the parabolic LED(s) associated with each of the first and second cameras 18 (or left and right channels of a stereo camera 18). Correspondingly, the two-dimensional image data from the first and second cameras 18 (or left and right channels of a stereo camera 18) are selectively read in a manner commensurate with the pulses of their associated parabolic LED(s). Under this configuration, gating of the cameras themselves is not required. Rather, sufficient data to implement triangulation can be accomplished using the interleaving modulation of image data collection as the corresponding parabolic LEDs are modulated on.

As an illustrative example, assume that the parabolic LED(s) associated with the first camera 18 are modulated ON for a short pulse. The processor 22A controls the first camera 18, e.g., for a certain time duration from $t_1$ to $t_2 = t_{1+}\delta t$, such that:

$$t_1 = 2d_1/c,$$

$$t_2 = 2d_2/c,$$

wherein $d_1$ is the predetermined closest distance of the target of interest 14 to the camera 18, $d_2$ is the predetermined furthest distance of the target of interest 14 to the camera, $\delta d = d_2 - d_1$ is the limited moving area of the target of interest 14, and $c = 3 \times 10^8$ m/s is the speed of the light. In this regard, the control electronics 22 does not read image data from the second camera.

Thus, the processor 22A modulates the parabolic LED(s) ON at time zero and modulates the parabolic LED(s) OFF at time $t_2$. Similarly, the processor 22A reads the first camera 18 at time $t_1$ and stops reading the first camera 18 at time $t_2$. The duration is computed as $2(d_2 - d_1)/c$. The above process can then be iterated.

Accordingly the operations of parabolic LED(s) and camera 18 may be synchronized. Since the pulse emitted by the parabolic LED(s) illuminates the target of interest 14, e.g., a participant such as a player of a video game in the area from $d_1$ to $d_2$, a stereo camera can obtain the participant's stereo image and measure the 3-D information of the participant, e.g., within a limited (and defined) three-dimensional space.

Suppose that the participant will engage the system in the limited area from 1.5 meters (m) to 3.5 m from the camera 18. In this example, the gate opening time is $\delta t = 2 \times 2 \, m/c = 13.4 \times 10^{-9} \, s = 13.4$ ns, which is a significantly long enough time period for the gating circuit 22B to control the camera 18 for proper gating function.

In this regard, the light emitted from the parabolic LED(s) does not create adverse effects, such as to the participant's eyes (unlike conventional laser beams that are unusable in the context of the present example due to the potential harmful effects of conventional lasers on the eyes of the participants). Moreover, conventional incandescent light cannot emit short pulse light. Further the visible light of a conventional incandescent light will be affected by ambient conditions such as the TV screen, computer monitor, wall/ceiling light etc.

However, the parabolic LED(s) of the present invention may be implemented as a semiconductor diode that can have a switching time on the order of nanoseconds and can be controlled by the gating circuit 22B. Moreover, as noted in greater detail herein, unlike a common LED beam (that has wide angle, low intensity and short distance), the beam emitted by PLED(s) can be collimated to reach long distance such as 3.5 m. Moreover, the invisible LED light of the PLED(s) may be constant and is not affected by visible ambient light.

Figure 12:
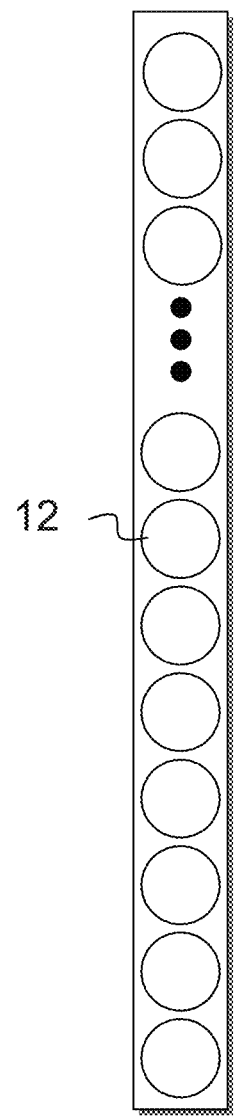
FIG. 12 illustrates a 1-D array of PLEDs suitable for scanning a space for measuring the location and/or movement of a target of interest, according to various aspects of the present invention.
Figure 13:
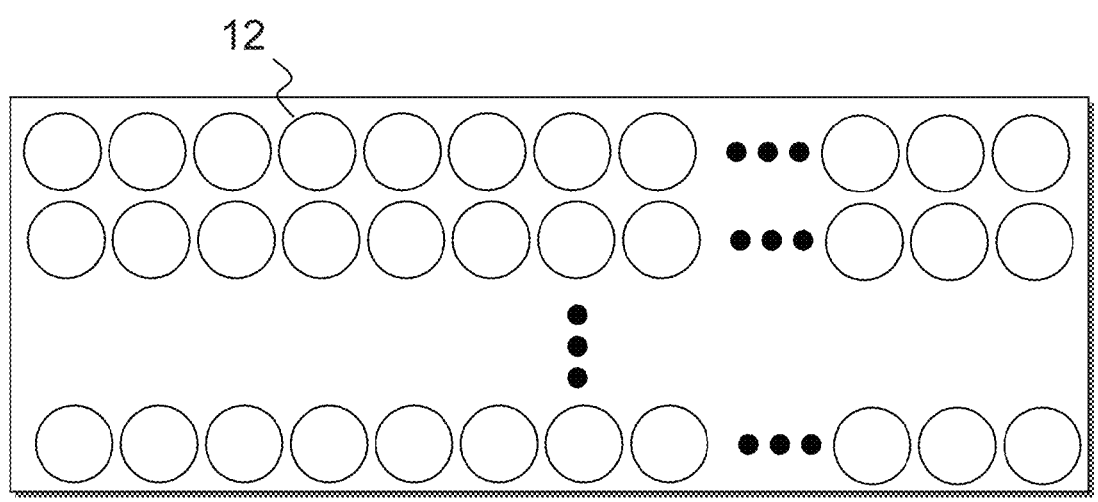
FIG. 13 illustrates a 2-D array of PLEDs suitable for measuring the location and/or movement of a target of interest, according to various aspects of the present invention.

As noted in greater detail herein, a single parabolic LED may form a 2-D raster scan a target of interest. Alternatively, a 1-D parabolic LED array may be utilized to implement a 1-D scan of the target of interest 14, e.g., a video game player, as illustrated by the vertically stacked 1-D PLED array illustrated in FIG. 12. Alternatively, a 2-D parabolic LED array may be utilized to illuminate the player without requiring a scan of the player, as illustrated by the 2-D parabolic LED system illustrated in FIG. 13. Moreover, in certain implementations, the above-described gated parabolic LED 12 techniques may be used to remove the background and shadows that extend beyond a distance determined by $d_2$. In this regard, a stereo camera 18 (or two discrete cameras) may be utilized to obtain the information necessary to generate necessary 3-D information from the 2-D images that have been processed to remove shadow and background noise.

According to further aspects of the present invention, 3-D information can also be derived from a single camera, such as by using segmentation techniques described more fully herein. For example, referring back to FIG. 1, the system 10 may comprise one or more invisible light parabolic LEDs 12 to emit a collimated thin beam or slightly divergent beam to illuminate the target of interest 14. The light emitted from the parabolic LED(s) 12 that is reflected by the target of interest 14, e.g., game participant, is received at the light receiving lens 16 of the associated camera 18, which is configured to convert the invisible light from the parabolic LED(s) 12 into an image, e.g., using a suitable image sensor 20 with an optional filter 24, such as a visible cutoff filter optically positioned in front of the lens 16 or image sensor 20. The output of the image sensor 20 is coupled to a processor 22A of the processing electronics 22, which may also be utilized to control features of the system such as the gating circuit 22B to facilitate the measurement objects of interest, such as the measurement of the participant's movement in the 3-D space.

In this regard, the parabolic LED(s) may be controlled by either the gating circuit 22B or some other process synchronized to the gating circuit 22B, to emit a short pulse beam, e.g., of invisible or near invisible light, thus illuminating a participant of a game or other interactive virtual software application. The optional gating circuit 22B is configured to open the gate 19 of a corresponding camera 18 when the PLED(s) are modulated ON during a short pulse. As an illustrative example, the camera 18 may open and close several times from $t_1$ to $t_2$ or from $d_1$ to $d_2$, such that several slices of the participant's image may be obtained for each parabolic LED pulse. Thus, the system may obtain 2-D images for discrete slices of time on the image sensor 20. Additionally, distance information may be obtained by combining information derived from a series of 2D image slices together in a segmentation process. For example, two or more slices may be evaluated to determine the movement distance, angle, orientation, speed of detected movement, etc., of the participant in a defined 3-D space to facilitate interaction with a game or virtual application requiring a position determination.

However, the gate 19 of the camera 18 must be fast enough to implement video segmentation and the camera 18 must be sensitive enough to respond the short pulse of the parabolic LED(s), which may be less than 1 ns. As an illustrative example, the system 10 may utilize the gating circuit 22B to control a crystal (not shown) to open and close the gate 19 of the camera 18. In this example, the image sensor 20 may be implemented as a high gain or intensified Charge Coupled Device (CCD). Although the gating is very fast the video frame rate may be slow. For example, the frame rate may be adjusted to 30 frames per second (f/s).

Also, the camera 18 may be always on. In this exemplary configuration, the gate of the camera 18 opens and closes with a frequency that may be on the order of nanoseconds per frame. As such, the signal can be accumulated to achieve a reasonable signal to noise ratio. Still further, a Complementary metal-oxide-semiconductor (CMOS) sensor, e.g., CCD/CMOS sensor that is less sensitive than a typical intensified CCD (ICCD) may be utilized to improve the image collection response time of the image sensor 20.

Figure 14:
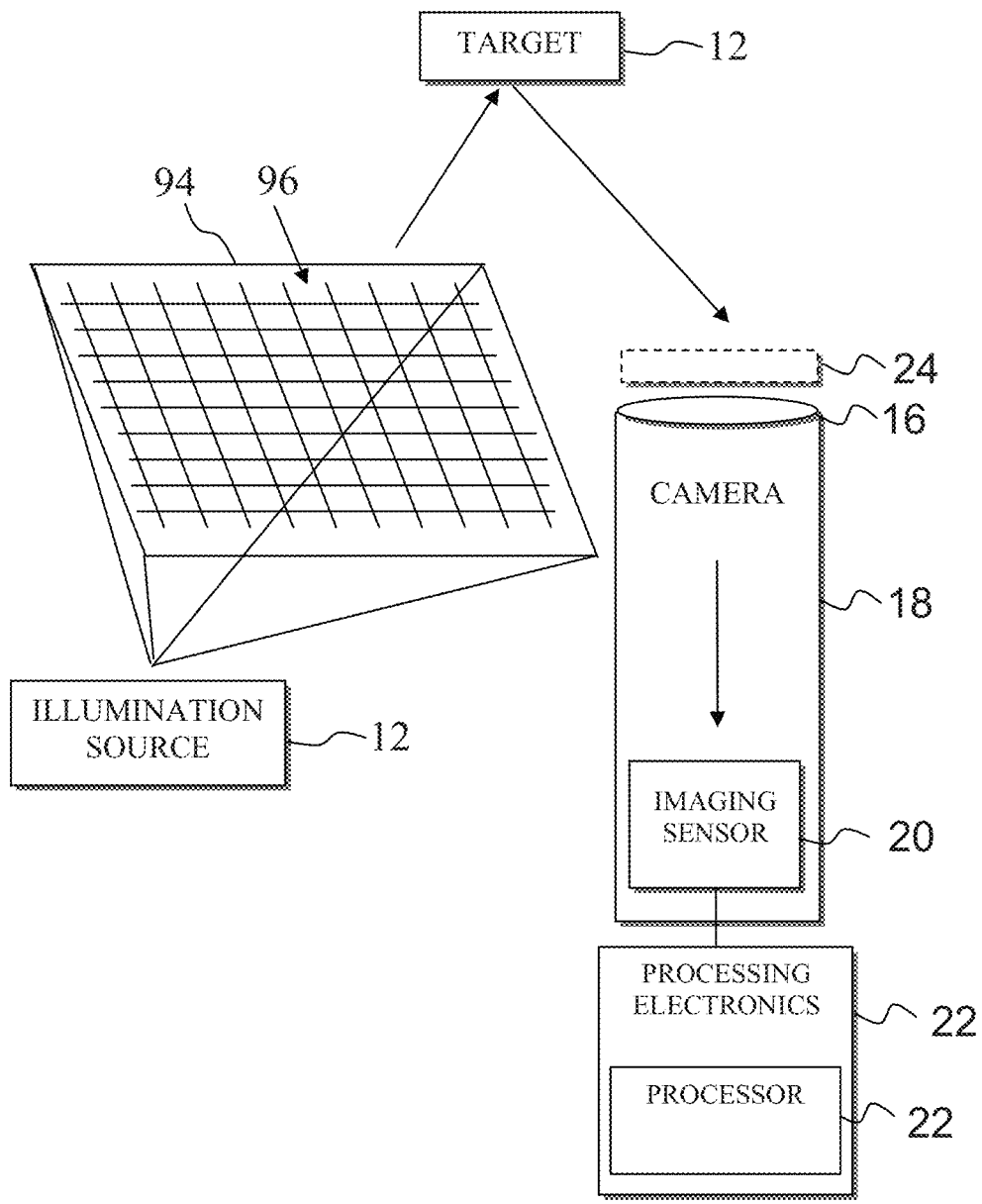
FIG. 14 is a schematic illustration of a system for measuring the location and/or movement of a target of interest using a grating, according to various aspects of the present invention.

Referring to FIG. 14, according to further aspects of the present invention, the illumination of the target 14 may be implemented using a coarse grating or grid light source that illuminates a space using for example, a strong divergent point source. As an illustration, the illumination source 12 may comprise a small invisible or visible light source that illuminates a grid mask 94 (coarse grating) having a grid pattern 96 therein. This arrangement causes light passing through the grid pattern 96 of the grid mask 94 to project a light pattern into a defined space. The grid pattern is reflected back and is collected by the camera 18 and corresponding image sensor 20.

As a participant moves within the defined space covered by the grid pattern, cells within the grid pattern 96 will be blocked from reflecting back to the camera 18. Moreover, as the participant moves within the defined space, the number of cells that are blocked will change and the location of blocked cells within the grid pattern 96 will change.

In this regard, the defined space may be controlled, for example, by adjusting the grid mask 94. For example, by increasing the size of the grid mask 94, the furthest distance measurable by the system can be increased. Correspondingly, the resolution of the measurements can be controlled by adjusting the density of cells in the grid pattern 96. That is, the larger the spacing between grid lines, the coarser the resolution. Correspondingly, the closer the grid lines are to one another, the finer the resolution of measurement capable by the system. However, in practice the grid or grating cannot be too dense so as to adversely affect performance of the system components.

By calibrating the size of the grid mask 94, including the dimensions of the grid pattern 96 with a known distance, the system can measure the distance and movement of the participant within the space defined by the projected grid pattern. Under this arrangement, the gating controls and corresponding logic are not necessary.

Figure 15:
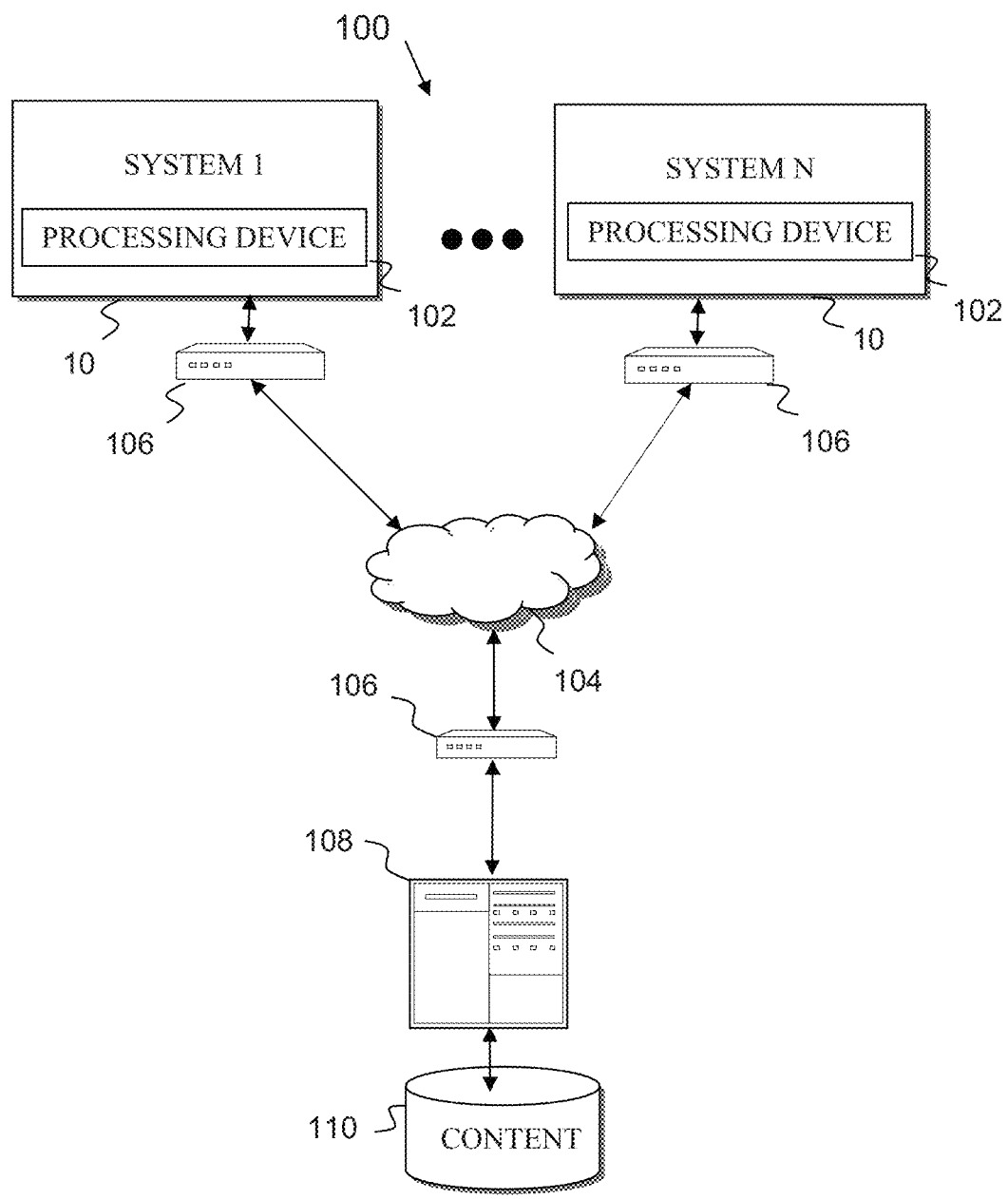
FIG. 15 is a schematic illustration of a computing environment for interconnecting instances of the systems described herein, according to various aspects of the present invention.

Referring to FIG. 15, a general diagram of a computer system 100 is illustrated, which may be utilized to interconnect instances of the systems 10 according to various aspects of the present invention. In general, two or more systems 10 may be linked together by a network 104 using a suitable processing device 102 capable of communicating over the network 104, which is either build into the control electronics 22 of each system or is connected thereto. This enables real-time or near real-time interaction despite the systems 10 being in different environments and different physical locations. For example, friends can compete against each other in a video game and their images can be present on the display because each system includes at least one camera.

The network 104 provides communications links between the various instances of the system 10, and may be supported by networking components 106 that interconnect the systems 10, including for example, routers, hubs, firewalls, network interfaces, wired or wireless communications links and corresponding interconnections. Moreover, the network 104 may comprise connections using one or more intranets, extranets, local area networks (LAN), wide area networks (WAN), wireless networks (WIFI), the Internet, including the world wide web, and/or other arrangements for enabling communication between the systems 10, in either real time or otherwise, e.g., via time shifting, batch processing, etc.

The illustrative system 100 also includes a plurality of servers 108, e.g., web servers, file servers, dedicated networked storage devices and/or other systems that store or otherwise manage information that may be utilized by the various systems 10, such as profiles, game information, etc. The system 100 is shown by way of illustration, and not by way of limitation, as a computing environment in which various aspects of the present invention may be practiced.

Various aspects of the present invention may be characterized in numerous ways, including by way of illustration and not by way of limitation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A system for measuring movement of a target for use by a video game or virtual interactive computer application comprising:

a camera having a light receiving lens and an image sensor for converting the light received through the light receiving lens to two-dimensional image data;

at least one illumination source associated with the camera, which emits light directed towards a target of interest within a limited three dimensional space, wherein the at least one illumination source comprises a parabolic light emitting diode (LED) including:
  a convex parabolic model;
  a concave parabolic reflector adjacent to the convex parabolic model;
  an LED die positioned proximate to the parabolic reflector; and
  first and second legs electrically coupled to the LED die; and processing electronics having a processor coupled to the image sensor that generates a digital representation of the target of interest, the processor further configured to:
  measure the time of flight of the light emitted by the illumination source to measure the distance to the target of interest;
  read the two-dimensional image data from the image sensor of the camera; and
  combine the time of flight measurement information with the two-dimensional image data obtained by the image sensor of the camera to generate a three dimensional information with regard to the target of interest.

2. The system of claim 1, wherein the LED die is positioned at the focal point or slightly off the focal point of the parabolic reflector to control the beam angle.

3. The system of claim 1, wherein the at least one illumination source comprises a parabolic light emitting diode that is controlled by the processor to implement a two-dimensional raster scan of the limited three dimensional space.

4. The system of claim 1, wherein the at least one illumination source comprises a one-dimensional parabolic light emitting diode array that is controlled by the processor to implement a one-dimensional raster scan of the limited three dimensional space.

5. The system of claim 1, wherein the at least one illumination source comprises a two-dimensional parabolic light emitting diode array that illuminates the limited three dimensional space.

6. The system of claim 1, wherein the at least one illumination source comprises a plurality of parabolic light emitting diodes arranged proximate to the light receiving lens of the camera so that the light receiving lens receives light from the parabolic light emitting diodes at an angle so as to at least substantially reduce detected shadows of the illuminated target of interest.

7. The system of claim 1, further comprising a retro reflective material that is associated with the target of interest, wherein the retro reflective material reflects light from the illumination source to the camera for position determination by the processor.

8. The system of claim 1, further comprising a grid mask including cells that allow light from the light source to pass through the grid mask, the grid mask positioned with regard to the illumination source so as to project a light pattern into the defined space corresponding to the limited three dimensional space.

9. The system of claim 8, wherein the two-dimensional image data includes data corresponding to grid cells blocked by the target of interest.

10. The system of claim 8, wherein the cells of the grid mask are arranged in a grid pattern.

11. The system of claim 1, wherein the illumination source emits visible light with an intensity that is sufficient to obtain contrast between the illumination source and the intensity of ambient light in three-dimensional space.

12. The system of claim 1, wherein the illumination source emits an invisible light that is compatible with the image sensor of the camera.

13. The system of claim 1, further comprising:
a computer coupled to a network; and
a display; wherein:
the processor communicates image data to the computer for display of the target of interest such that the computer communicates image data across the network to at least one location.

14. A system for measuring movement of a target for use by a video game or virtual interactive computer application comprising:
a camera having a light receiving lens and an image sensor for converting the light received through the light receiving lens to two-dimensional image data;
at least one illumination source associated with the camera, which emits light directed towards a target of interest within a limited three dimensional space, wherein the at least one illumination source comprises a parabolic light emitting diode that is controlled by the processor to implement a select one of: two-dimensional raster scan of the limited three dimensional space one-dimensional raster scan of the limited three dimensional space; and
processing electronics having a processor coupled to the image sensor that generates a digital representation of the target of interest, the processor further configured to:
measure the time of flight of the light emitted by the illumination source to measure the distance to the target of interest;
read the two-dimensional image data from the image sensor of the camera; and
combine the time of flight measurement information with the two-dimensional image data obtained by the image sensor of the camera to generate a three dimensional information with regard to the target of interest.

15. A system for measuring movement of a target for use by a video game or virtual interactive computer application comprising:
a camera having a light receiving lens and an image sensor for converting the light received through the light receiving lens to two-dimensional image data;
at least one illumination source associated with the camera, which emits light directed towards a target of interest within a limited three dimensional space, wherein the at least one illumination source comprises a two-dimensional parabolic light emitting diode array that illuminates the limited three dimensional space; and
processing electronics having a processor coupled to the image sensor that generates a digital representation of the target of interest, the processor further configured to:
measure the time of flight of the light emitted by the illumination source to measure the distance to the target of interest;
read the two-dimensional image data from the image sensor of the camera; and
combine the time of flight measurement information with the two-dimensional image data obtained by the image sensor of the camera to generate a three dimensional information with regard to the target of interest.

* * * * *